United States Patent [19]

Pelrine

[11] Patent Number: 4,568,524
[45] Date of Patent: Feb. 4, 1986

[54] HYDROPROCESSING REACTOR FOR CATALYTICALLY DEWAXING LIQUID PETROLEUM FEEDSTOCKS

[75] Inventor: Bruce P. Pelrine, Lawrenceville, N.J.

[73] Assignee: Mobil Oil Corporation, New York, N.Y.

[21] Appl. No.: 621,980

[22] Filed: Jun. 18, 1984

[51] Int. Cl.$^4$ ................................................ B01J 8/02
[52] U.S. Cl. ...................................... 422/218; 422/239
[58] Field of Search ............... 422/148, 192, 216, 218, 422/239; 55/74, 233; 261/23 R, 94, 96

[56] References Cited

U.S. PATENT DOCUMENTS

| | | | |
|---|---|---|---|
| 1,995,292 | 3/1935 | Clark | 422/216 |
| 2,315,208 | 3/1943 | Kinnaird | 422/218 |
| 3,754,078 | 8/1973 | Hinrichs et al. | 422/148 |
| 4,222,855 | 9/1980 | Pelrine et al. | 208/120 |
| 4,244,921 | 1/1981 | Tasior et al. | 422/192 |

FOREIGN PATENT DOCUMENTS 1211682 11/1970 United Kingdom .................. 55/233

*Primary Examiner*—David L. Lacey
*Attorney, Agent, or Firm*—Alexander J. McKillop; Michael G. Gilman; James F. Powers, Jr.

[57] ABSTRACT

A reactor for catalytically dewaxing a waxy distillate consisting of a lubricating oil or liquid petroleum feedstocks utilizing a shape-selective crystalline aluminosilicate zeolite catalyst in order to obtain a lubricating oil having a low pour point and a high viscosity index, and particularly, a hydroprocessing trickle reactor construction for catalytically dewaxing liquid petroleum feedstocks. The reactor is essentially constituted of a trickle bed reactor of the vertical tower type wherein an annular bed of catalyst material, such as the crystalline zeolite, substantially fills the space of the reactor, and through which the liquid petroleum feedstock trickles downwardly from the upper end of the reactor, while hydrogen is concurrently injected into a central hollow tube of a perforate material extending vertically through the reactor within the annular catalyst bed. The hydrogen, under a pressure somewhat higher than the pressure reigning in the catalyst bed, passes radially outwardly so as to axially flow through the catalyst material. This radial flow causes the hydrogen to percolate through the annular catalyst bed and to contact and efficiently strip the downwardly trickling stream of liquid petroleum feedstock of low boiling conversion products or waxy components, such as naphtha. The generated gases resulting from the reaction, such as hydrogen, naphtha and LPG, are collected in an annular space provided by a double-wall shell extending about the catalyst bed, with the inner wall being perforate, and are discharged through an outlet conduit communicating with the lower end of the reactor, while the dewaxes liquid components trickling down out of the catalyst bed are discharged through another bottom outlet of the reactor.

7 Claims, 1 Drawing Figure

U.S. Patent    Feb. 4, 1986    4,568,524
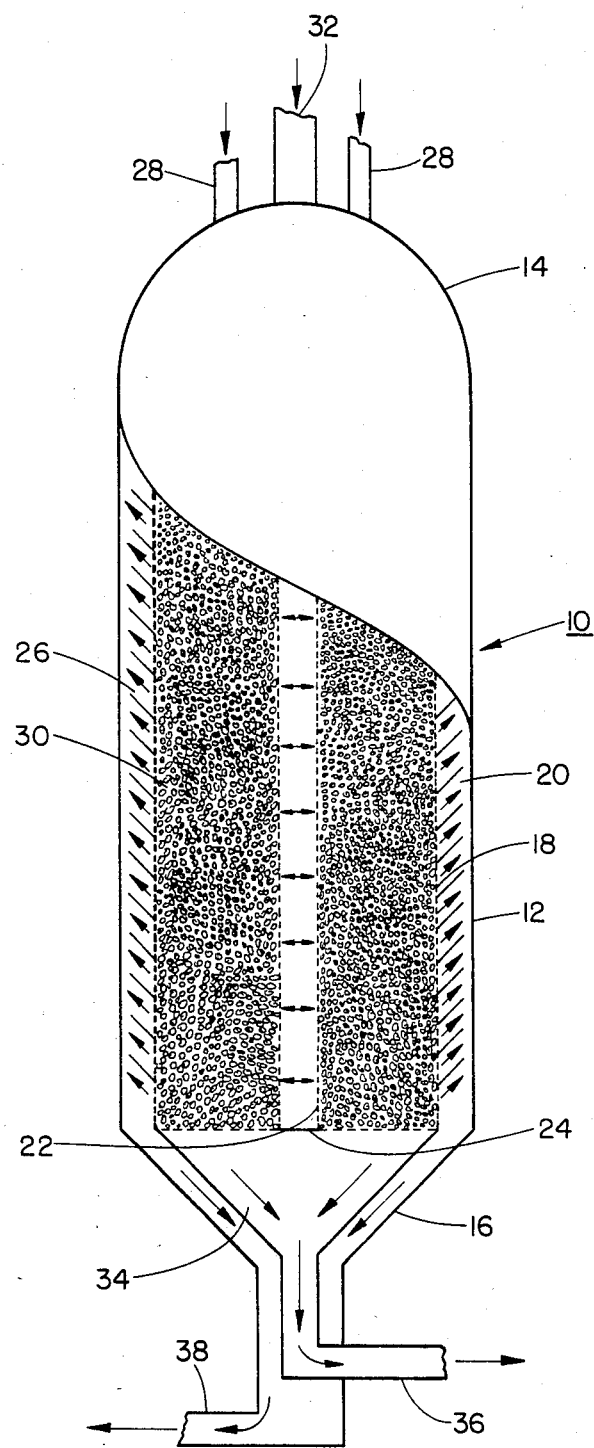

HYDROPROCESSING REACTOR FOR CATALYTICALLY DEWAXING LIQUID PETROLEUM FEEDSTOCKS

BACKGROUND OF THE INVENTION

1. Field of the Invention

The present invention relates to a reactor for catalytically dewaxing a waxy distillate consisting of a lubricating oil or liquid petroleum feedstocks utilizing a shape-selective crystalline aluminosilicate zeolite catalyst in order to obtain a lubricating oil having a low pour point and a high viscosity index, and more particularly, relates to a novel and unique hydroprocessing trickle reactor construction of the tower-type for catalytically dewaxing liquid petroleum feedstocks.

In the hydroprocessing of liquid petroleum feedstocks, and particularly so called heavy feedstocks, it is a basic purpose of the process of catalytically dewaxing the liquid petroleum feedstocks of removing lighter conversion products from the liquid petroleum flow while concurrently providing a hydrogenative environment for catalytic conversion, which is particularly utilized in the case of the processing of highly waxy feedstocks, such as in catalytic lube processing. Frequently, lighter products which are obtained from cracking and/or hydrocracking reactions compete with the heavier feed molecules for access to the acidic cracking sites in zeolites or silica-alumina cracking catalysts which are employed in the implementation of the catalytic dewaxing processes. In as much as these lighter products diffuse more rapidly into the catalyst than the larger feed molecules, they have a tendency to retard the rate of conversion of the heavier molecules. Moreover, the lighter products also tend to be either more difficult to crack, such as low molecular weight parafins, or easier to polymerize, such as low molecular weight olefins, and possess a tendency to coke more readily then their heavier counterparts so as to thereby retard the conversion of the heavier molecules to an even greater extent.

2. Discussion of the Prior Art

This competition between the light and heavy liquid petroleum molecules obtained from the cracking or hydrocracking process for access to catalytic sites is rendered particularly critical when there is employed a catalyst which is essentially constituted of a shape-selective zeolite, for example, a defined crystalline aluminosilicate zeolite catalyst, such as ZSM-5, for the dewaxing of liquid petroleum or lube stocks under moderate hydrogen pressures (400 psig) and at moderate temperatures (550° F. to 675° F.). In a typical reactor employing a zeolite catalyst, such as zeolite ZSM-5 compounds which boil at temperatures higher than 650° F. flow concurrently with naphtha and LPG over the shape-selective catalyst. Processes and reactors which utilize aluminosilicate zeolite catalysts, such as ZSM-5, or other zeolites having smaller pore openings, such as ZSM-11, ZSM-12 and larger then those of erionite or zeolite ZK-5; ZSM-23 and ZSM-35, are disclosed in Bruce P. Pelrine et al. U.S. Pat. No. 4,222,855 and in Nai Y. Chen et al. U.S. Reissue Pat. No. 28,398, both assigned to the Mobil Oil Corporation, and the disclosures of which are incorporated herein by reference. Although the utilization of different types of hydroprocessing reactors for the implementation of catalytic dewaxing processes for liquid petroleum lube or feedstock is broadly disclosed in the prior art, as exemplified by the above-mentioned U.S. patents, broadly referring to stirring tank-type reactors or trickle bed reactors, there is an obvious need in the technology to more precisely define specific hydroprocessing reactor designs which, in a highly efficient and novel manner, will facilitate the removal of the lighter product from the liquid petroleum feedstocks through the intermediary of hydrogen stripping while concurrently preserving an intimate three-phase contacting relationship among hydrogen, liquid petroleum feedstock and catalyst, which is necessary for the efficient hydrotreatment and upgrading through the dewaxing of the liquid petroleum feedstocks.

SUMMARY OF THE INVENTION

In essence, the present invention provides for a novel hydroprocessing reactor construction which will facilitate the catalytic dewaxing of liquid petroleum or lube feedstocks in a highly efficient and economical manner, particularly through the use of reactors employing stationary beds of a defined, shape-selective crystalline aluminosilicate zeolite catalyst, preferably ZSM-5. Pursuant to particular features of the inventive hydroprocessing reactor, the latter is essentially constituted of a trickle bed reactor of the vertical tower type wherein an annular bed of catalyst material, such as the crystalline zeolite, substantially fills the space of the reactor, and through which the liquid petroleum feedstock trickles downwardly from the upper end of the reactor, while hydrogen is concurrently injected into a central hollow tube of a perforate material extending vertically through the reactor within the annular catalyst bed. The hydrogen, under a pressure somewhat higher than the pressure reigning in the catalyst bed, passes radially outwardly so as to axially flow through the catalyst material. This radial flow causes the hydrogen to percolate through the annular catalyst bed and to contact and efficiently strip the downwardly trickling stream of liquid petroleum feedstock of low boiling conversion products or waxy components, such as naphtha. The generated gases resulting from the reaction, such as hydrogen, naphtha and LPG, are collected in an annular space provided by a double-wall shell extending about the catalyst bed, with the inner wall being perforate, and are discharged through an outlet conduit communicating with the lower end of the reactor, while the dewaxed liquid components trickling down out of the catalyst bed are discharged through another bottom outlet of the reactor.

Pursuant to a specific feature of the inventive hydroprocessing catalytic reactor construction, extending radially outwardly from the outer surface of the inner perforate wall of the double-walled shell of the reactor so as to project into the annular space between the shell walls, and a plurality of vertically spaced, upwardly inclined circumferential weirs, distributed along the height of the catalyst bed so as to cause any dewaxed liquid petroleum components carried radially outwardly by hydrogen gas entering the annular space to flow back along the inclined weir surfaces into the catalyst bed. This will effectively reduce or prevent any losses of the dewaxed liquid petroleum components by means of the hydrogen percolating through the catalyst bed and reacting with the liquid petroleum feedstock in the presence of the catalyst.

Accordingly, it is a primary object of the present invention to provide a novel hydroprocessing reactor of the trickle type for catalytically dewaxing liquid petroleum feedstocks.

It is a more specific object of the present invention to provide a hydroprocessing trickle reactor of the type described wherein lighter volatile or low boiling conversion products are stripped from liquid petroleum feedstock trickling downwardly through a stationary catalyst bed by means of hydrogen percolating therewith, the gases of hydrogen and volatile conversion products entrained therein being discharged through an outlet at the lower end of the reactor, and the dewaxed liquid petroleum components being discharged through another outlet at the reactor bottom.

BRIEF DESCRIPTION OF THE DRAWING

Reference may now be had to the following detailed description of a preferred embodiment of the invention which is representative of a vertical tower-type hydroprocessing trickle reactor for catalytically dewaxing liquid petroleum feedstocks, taken in conjunction with the single FIGURE of the accompanying drawing; in which there is illustrated a vertical sectional, generally schematic view through a hydroprocessing trickle reactor constructed pursuant to the invention.

DETAILED DESCRIPTION

Referring now in detail to the embodiment of the hydroprocessing reactor 10 as illustrated in the single FIGURE of the drawing, the reactor consists of an essentially upright or vertically arranged container or tower, which may be of cylindrical construction, and which has an outer impervious cylindrical shell or wall 12, a domed head end cover structure 14, and a conically reducing lower discharge or funnel-shaped wall structure 16.

Coaxially arranged within the outer wall or cylindrical shell 12 is an cylindrical wall member 18 of a permeable or perforate construction, and is spaced therefrom so as to define an annular passageway 20 therebetween extending substantially over the full cylindrical height of the reactor tower 10.

Extending downwardly and coaxially about the longitudinal centerline of the reactor 10 is a central tube 22 which is also constructed from a permeable or perforate material, and which has a closed lower end 24 at the bottom of the reactor at about the plane where the cylindrical wall 12 adjoins the funnel-shaped portion 16.

Interposed in and filling the space between the central tube 22 and the permeable cylindrical wall 18 is an annular catalyst bed 30 of catalyst material which, in a preferred instance, is constituted of a shape-selective crystalline aluminosilicate zeolite catalyst, preferably supported metal ZSM-5, although other zeolites, such as described in Pelrine et al. U.S. Pat. No. 4,222,855 and Chen et al. U.S. Reissue Pat. No. 28,398, may also be suitably employed as the catalyst material.

Extending radially outwardly and sloping in upwardly inclined orientation from the outer surface of the permeable inner cylindrical wall 18 are a plurality of circumferential weirs 26 of an imperforate material, which project into the annular space 20 between the walls 12 and 18, and which are spaced fastened along the vertical height of the wall 18 of the reactor 10.

Inlet ports 28 for a liquid petroleum feedstock extend through the upper cover structure 14 of the reactor so as to allow for the infeed and trickling down of liquid petroleum feedstock through the annular bed of catalyst material 30 which fills the interspace between the permeable central tube 22 and the cylindrical permeable wall 18.

The upper end of the central tube 22 extends outwardly of the reactor cover structure 14 where it connects with an inlet 32 for gaseous hydrogen, which is under a slightly higher pressure than the area containing the bed of catalyst material 30 in the reactor 10.

Consequently, as the liquid petroleum feedstock trickles downwardly through the bed of catalyst material 30 towards the lower end of the reactor 10, it is contacted by hydrogen percolating radially outwardly through the catalyst from interiorly of the central tube 22. The feedstock is cracked in the presence of the catalyst and forms volatile products such as light gas fractions and naphtha which are entrained in the hydrogen gas. The radial flow of the hydrogen through the catalyst bed will sweep these volatile products or components from the catalyst material 30 through the permeable wall 18 radially outwardly into the annular space 20 between the permeable wall 18 and the outer shell wall 12 of the reactor. The primary dewaxed components remaining in the catalyst bed 30 in a liquid state is essentially inhibited from being directed downwardly in the annular passageway due to the presence of the upwardly inclined weirs 26 which will effect a return flow or trickle of this liquid material back into the catalyst material, and with the liquid also being inhibited from flowing into the central tube 22 due to the slightly higher pressure of the hydrogen gas conducted therethrough.

Consequently, the dewaxed liquid components of the feedstock which has been hydroprocessed in the reactor 10 will flow downwardly from the catalyst bed into the funnel-shaped space 34 below wall 18 which is located within the funnel-shaped portion 16, and is discharged from the reactor through an outlet conduit 36 for possible further processing.

Concurrently, the hydrogen gas with the entrained lighter fractions therein, such as the volatilized components of the liquid feedstock, such as naphtha and LPG, will stream downwardly through the annular space 20 externally of the weirs 26, and through the region between funnel section 34 and the funnel portion 16 into an outlet 38.

The intimate contacting of the hydrogen in the presence of the zeolite catalyst material with the downward trickling flow of the liquid petroleum feedstock will produce a catalytic reaction, preferably under moderate hydrogen pressures of about 400 psig and moderate temperatures of 550° to 675° F., to cause compounds boiling at temperatures higher then 650° to flow concurrently with naphtha and LPG in the liquid petroleum feedstock over the shape-selective zeolite catalyst.

The lighter, more readily boiling or volatile products from the heavy feedstock liquid are caused to be stripped from the heavier fraction by the reaction while, at the same time, preserving the intimate three-phase contacting relationship among the hydrogen, liquid petroleum feedstock and crystalline zeolite catalyst, so as to be conducted in a gaseous form from the catalyst bed, while the heavier liquid fraction being dewaxed by the reaction continues to trickle downwardly through catalyst bed for continuing dewaxing.

Upon the stripping of the lighter volatile components or conversion products from the liquid petroleum feedstock, a typical product distribution from such a dewaxing reaction is as set forth in Table 1 hereinbelow:

TABLE 1

Product Distribution

| | |
|---|---|
| Methane | 0.04 wt. % |
| Ethane/Ethene | 0.09 |
| Propene | 0.03 |
| Propane | 2.13 |
| Total Dry Gas | 2.29 |
| Isobutane | 1.37 |
| Butenes | 0.03 |
| n-Butane | 1.44 |
| Total $C_4$'s | 2.84 |
| Total $C_5$'s | 1.98 |
| Naphtha, $C_6^+$ | 3.20 |
| Lube Fraction (dewaxed) | 89.69 |

From the foregoing it becomes readily apparent to one skilled in the art that the present invention provides for a novel and improved hydroprocessing reactor for catalytically and efficiently dewaxing liquid petroleum feedstocks with a significant increase in the reaction rate and concommitent reductions in the catalyst coking rate, thereby resulting in appreciable capital cost savings through reduced reactor size and catalyst fill requirements, and also providing for reduced operating costs through reductions in down time for catalyst reactivation and rejuvenation. Furthermore, an additional economic advantage which is obtained through the inventive reactor design lies in that more of the cracked or hydrocracked product from the liquid petroleum feedstocks are recovered as utilizeable naphtha boiling range components rather than as light gas.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A hydroprocessing reactor for catalytically dewaxing liquid petroleum feedstocks; comprising:
   (a) a generally upright, cylindrical container having spaced inner and outer circumferential walls defining an annular space therebetween, said outer wall being imperforate and said inner wall being of a gas-permeable material;
   (b) first closure means sealing the upper end of said container and second closure means sealing the bottom end of said container;
   (c) a permeable tube centrally extending through said container in coaxial relationship with said permeable inner circumferential container wall, said tube having a closed bottom end and having the upper end thereof extending through said first closure means;
   (d) a catalyst bed of a crystalline catalyst material substantially filling the annular space between said permeable central tube and the permeable inner circumferential container wall;
   (e) first inlet means extending through said first closure means for introducing liquid petroleum feedstock into the upper end of said catalyst bed, said liquid feedstock trickling downwardly through said catalyst bed; and
   (f) means for introducing hydrogen into the upper end of said central tube at a pressure to cause said hydrogen to percolate radially outwardly through said catalyst bed and react with the liquid petroleum feedstock trickling downwardly to strip low-boiling volatile conversion products therefrom, said hydrogen and entrained conversion products flowing through the permeable inner container wall into said annular space and being discharged from the reactor through an outlet communicating with the lower end of said annular space, while the dewaxed liquid components of said feedstock are discharged from the reactor through a further outlet communicating with the lower end of the catalyst bed.

2. A reactor as claimed in claim 1, comprising a plurality of vertical spaced, upwardly sloping circumferential weirs extending radially outwardly from the outer surface of said inner container wall into the annular space between said inner and outer container walls so as to cause liquid feedstock components entrained in the gases flowing into said annular space from the catalyst bed to be reconveyed into said catalyst bed.

3. A reactor as claimed in claim 1, wherein said second closure means comprises a funnel-shaped wall structure interconnecting the bottom end of said outer container wall with the outlet for said hydrogen gas and entrained volatile conversion products, and a further funnel-shaped wall structure arranged within said first-mentioned funnel-shaped wall structure interconnecting the lower end of said inner container wall with the further outlet.

4. A reaction as claimed in claim 1, wherein said catalyst comprises a shape-selective crystalline catalyst material.

5. A reactor as claimed in claim 4, wherein said catalyst material comprises an aluminosilicate.

6. A reactor as claimed in claim 4 wherein said catalyst material comprises zeolite.

7. A reactor as claimed in claim 6, wherein said zeolite is ZSM-5.

* * * * *